United States Patent
Searcy et al.

(10) Patent No.: US 6,556,166 B1
(45) Date of Patent: Apr. 29, 2003

(54) METHOD OF MEASURING ELEVATIONAL MIS-ALIGNMENT OF AN AUTOMOTIVE RADAR SENSOR

(75) Inventors: James Fredrick Searcy, Carmel, IN (US); David Leo Hart, Westfield, IN (US); Stephen William Alland, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/078,872

(22) Filed: Feb. 19, 2002

(51) Int. Cl.[7] .................................................. G01S 7/40
(52) U.S. Cl. ....................... 342/165; 342/173; 342/174; 343/703
(58) Field of Search ................................. 342/165, 173, 342/174; 343/703

(56) References Cited

U.S. PATENT DOCUMENTS

| | | | |
|---|---|---|---|
| 4,333,081 A | * 6/1982 | Hofgen | 342/173 |
| 6,020,844 A | * 2/2000 | Bai et al. | 342/147 |
| 6,087,995 A |   7/2000 | Grace et al. | 343/703 |
| 6,335,705 B1 | * 1/2002 | Grace et al. | 342/174 |
| 6,437,731 B1 | * 8/2002 | Henrio et al. | 342/165 |

* cited by examiner

Primary Examiner—Thomas H. Tarcza
Assistant Examiner—Isam Alsomiri
(74) Attorney, Agent, or Firm—Robert M. Sigler

(57) ABSTRACT

A method of measuring elevational misalignment of an automotive radar sensor in a factory or service setting utilizes two or more targets that can be discriminated by the radar system. The targets are positioned at different elevational angles with respect to the desired elevation axis, and the degree of elevational misalignment is determined according to the ratio or difference in return signal amplitude for the two targets. Discrimination of the targets may be ensured by differences in range, azimuth angle or Doppler. Since the amplitude difference is a measure of misalignment, the measurement may be used to verify proper alignment or to indicate the amount of adjustment required to achieve proper alignment.

7 Claims, 2 Drawing Sheets

METHOD OF MEASURING ELEVATIONAL MIS-ALIGNMENT OF AN AUTOMOTIVE RADAR SENSOR

TECHNICAL FIELD

The present invention relates to automotive radar sensors for adaptive cruise control and/or collision warning, for example, and more particularly to a method of detecting elevation mis-alignment of the radar sensor.

BACKGROUND OF THE INVENTION

Automotive radar sensors typically have a limited field of view and are scanned in a horizontal (azimuth) plane to detect objects of interest. Although the elevation of a detected object is ordinarily not important, proper elevational alignment of the radar sensor is important to enable reliable identification of objects at relatively long range, and to facilitate rejection of overhead objects such as road signs and bridges. For this reason, radar sensors usually include an adjustment mechanism such as a screw that is rotated to change the elevation alignment of the sensor with respect to a vehicle mounting bracket.

The elevational alignment of a radar sensor may be determined either mechanically by using a bubble level or the like, or electronically by monitoring the emitted signal strength in the center of the elevation field of view or the return signal strength from a test target in the center of the elevation field of view. The electronic techniques are more amenable to factory or dealer calibration, in which case the elevation mechanism is adjusted either manually or automatically until maximum signal strength (emitted or returned) is achieved. A similar technique can be used for azimuth alignment, as described for example, in the U.S. Pat. No. 6,087,995 to Grace et al., where azimuth and elevation alignment are achieved simultaneously by adjusting the alignment to maximize a summation of the azimuth and elevation signals impinging on a set of interferometers aligned with the thrust axis of the vehicle. However, the sensitivity of the emitted or returned signal strength to changes in elevational alignment becomes very low as the sensor approaches the desired alignment, making precise and accurate alignment of the sensor very difficult to achieve. Moreover, many adjustments and measurements are usually required to optimize the alignment since no single measurement yields a reliable measure of the degree or direction of misalignment. Accordingly, what is needed is a method of determining the elevational misalignment of an automotive radar sensor with a single high sensitivity measurement.

SUMMARY OF THE INVENTION

The present invention is directed to an improved method of measuring elevational misalignment of an automotive radar sensor in a factory or service setting. According to the invention, two or more targets that can be discriminated by the radar system are positioned at different elevational angles with respect to the desired elevation angle, and the degree of elevational misalignment is determined according to the ratio or difference in return signal amplitude for the two targets. Discrimination of the targets may be ensured by Doppler (if the target is a transponder), or by differences in range or azimuth angle, provided of course, that signal strength variation due to the differences in range or azimuth angle are normalized. Since the amplitude difference is a measure of misalignment, the measurement may be used to verify proper alignment or to indicate the amount of adjustment required to achieve proper alignment.

DESCRIPTION OF THE PREFERRED EMBODIMENT

Figure 1:
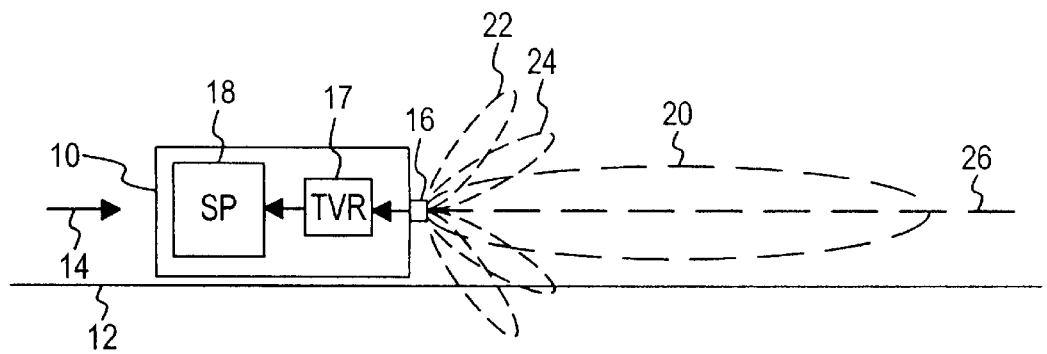
FIG. 1 is a diagram of an automotive radar system including a radar sensor, a transceiver and a signal processor.

The present invention is disclosed in the context of an automotive forward-looking radar system designed to support vehicle control functions such as adaptive cruise control, collision warning, collision avoidance, and the like. FIG. 1 depicts a radar-equipped vehicle 10 traveling on a road surface 12 in the direction of arrow 14. The depicted radar system components include a radar sensor or antenna 16, a transceiver (TVR) 17 and a signal processor (SP) 18. During vehicle operation, the transceiver 17 is activated to emit high frequency energy through antenna 16 in a characteristic beam pattern in a target detection zone forward of the vehicle. When the emitted energy impinges on a target such as an obstacle or another vehicle, energy is reflected back to the transceiver 17 through antenna 16, and the signal processor 18 analyzes the reflected signal to discriminate individual targets and to determine their range and range-rate.

The emitted energy pattern includes a main lobe 20 and one or more principle side-lobes 22, 24, and the radar antenna 16 is adjustably mounted in vehicle 10 so that the elevation angle of the main lobe 20 may be calibrated to a specified value, designated in FIG. 1 by the axis 26. Proper elevational alignment of the antenna 16 will be checked initially in the vehicle assembly plant, and periodically thereafter to ensure proper operation of the system and associated vehicle control functions. Although the elevation of a detected object is ordinarily not important for vehicle control functions, proper elevational alignment of the antenna 16 is important to enable reliable identification of objects at relatively long range, and to facilitate rejection of overhead objects such as road signs and bridges.

As discussed above, elevational alignment is ordinarily performed by placing interferometers or a reflector in the center of the elevation field of ice (that is, on the axis 26), measuring the strength of the emitted or reflected signal energy, and then adjusting the antenna elevation alignment until the signal energy is maximized. However, it is difficult to achieve accurate elevational alignment in this way due to low sensitivity, and the need to make numerous measurements and adjustments. This can be illustrated by the graph of FIG. 2, where the solid trace 28 depicts the reflected signal energy reduction in decibels as a function of the misalignment of a target from the elevational axis 26 for a radiated beam width of approximately 4 degrees. A factory-specified elevational alignment tolerance of +/− one degree is designated by the reference numeral 30, and it can be seen that the reflected signal strength varies by only a small amount within the specified tolerance band. In fact, the sensitivity is essentially 0.0 dB per degree when the antenna 16 is in exact alignment and only 2.0 dB per degree when the alignment is barely within the specified tolerance band. Additionally, the signal strength measurement does not indicate misalignment per se, and the elevational orientation of the transceiver 17 has to be ad Lusted to determine if signal strength is at or near maximum.

The method of the present invention overcomes the aforementioned difficulties by measuring the actual elevational misalignment. If the misalignment is within the specified tolerance band, no adjustment of the antenna 16 is required; if the misalignment is outside the tolerance band, the alignment of the antenna 16 may be adjusted without making any further measurements, or in closed-loop fashion to bring the measured misalignment within the tolerance band or to zero. According to the invention, the misalignment is measured by placing two distinguishable targets at known angles relative to the desired elevational angle, and forming a ratio or difference of the signal strengths associated with the two targets. The ratio or difference will have a predetermined value based on the target angles when the antenna 16 is properly aligned, and will be above or below the predetermined value in relation to the degree of elevational misalignment when the antenna 16 is misaligned. Discrimination of the targets is most simply ensured by placing them at different ranges from antenna 16, or at different azimuth angles, provided of course, that signal strength variation due to the differences in range or azimuth angle are normalized. Alternatively, the targets may be transponders that emit different frequencies when illuminated by the beam 20, in which case the transceiver 17 will discriminate the targets by apparent Doppler frequency.

Figure 2:
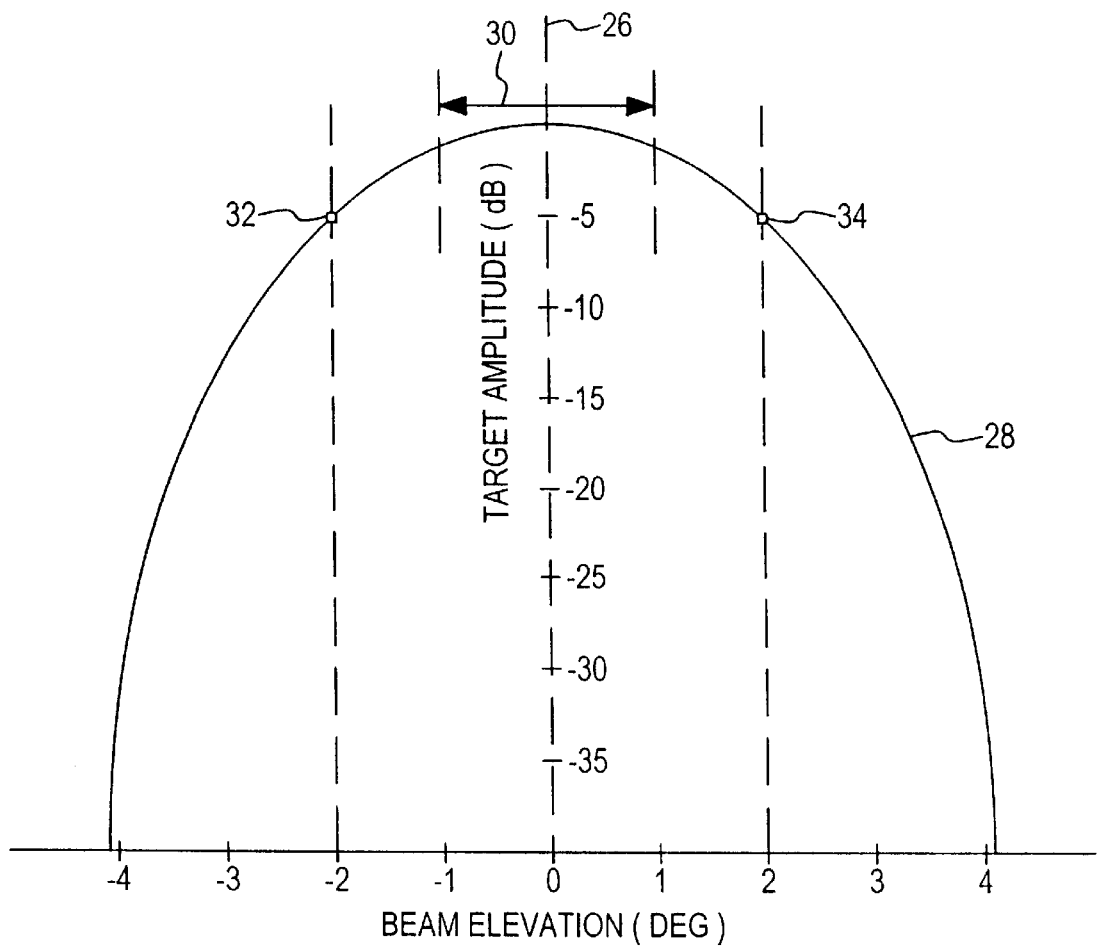
FIG. 2 is a graph depicting target amplitude as a function of elevational alignment for the system of FIG. 1, and a pair of targets positioned according to this invention.
Figure 3:
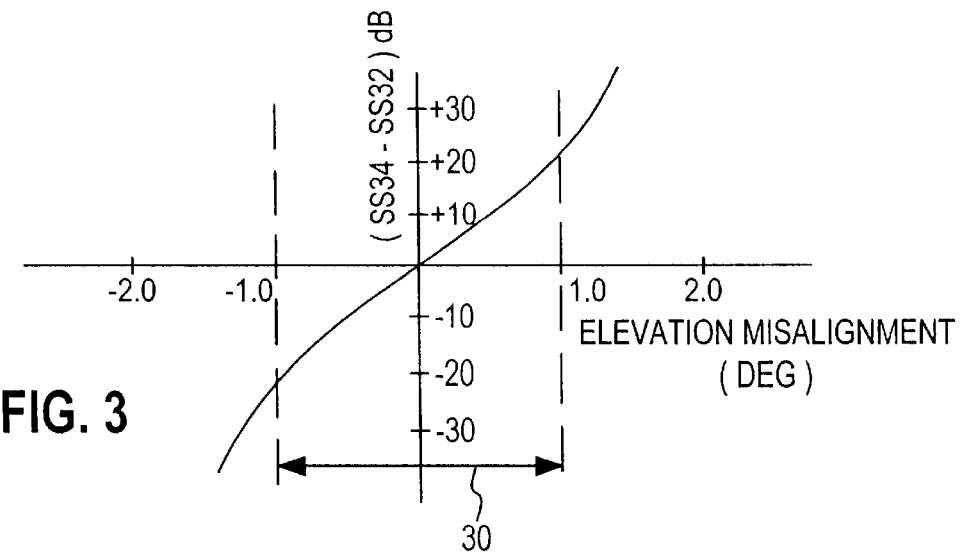
FIG. 3 is a graph depicting a difference in return signal strength for the two targets depicted in FIG. 2 as a function of elevation misalignment.

The targets are designated in FIG. 2 by the reference numerals 32 and 34, and in the illustrated embodiment, are oppositely disposed about the axis 26 and separated in elevation by the beam width of antenna 16. In the illustrated embodiment, for example, antenna 16 has a 3 dB main lobe beam width of approximately four degrees, and the targets 32 and 34 are located at +/- two degrees of elevation with respect to axis 26, as shown in FIG. 2. If the antenna 16 has no elevational misalignment, the reflected signal strengths from the targets 32 and 34 ($SS_{32}$ and $SS_{34}$) will be equal; in this case, the ratio ($SS_{34}/SS_{32}$) will be have a value of one, or alternatively, the difference ($SS_{34}-SS_{32}$) will have a value of zero. However, if the antenna 16 has a positive elevational misalignment, $SS_{34}$ will be greater than $SS_{32}$, and the extent of misalignment will be indicated by the degree to which the ratio ($SS_{34}/SS_{32}$) deviates from unity, or by the magnitude of the difference ($SS_{34}-SS_{32}$). It will thus be recognized that the measurement indicates not only the magnitude of elevational misalignment, but also the direction of misalignment. FIG. 3 graphically depicts the difference ($SS_{34}-SS_{32}$) in decibels as a function of the elevational misalignment of antenna 16. Significantly, the sensitivity is several times higher than for the single target alignment technique, and approximately constant across the specified tolerance band 30 of +/- one degree of elevation.

Figure 4:
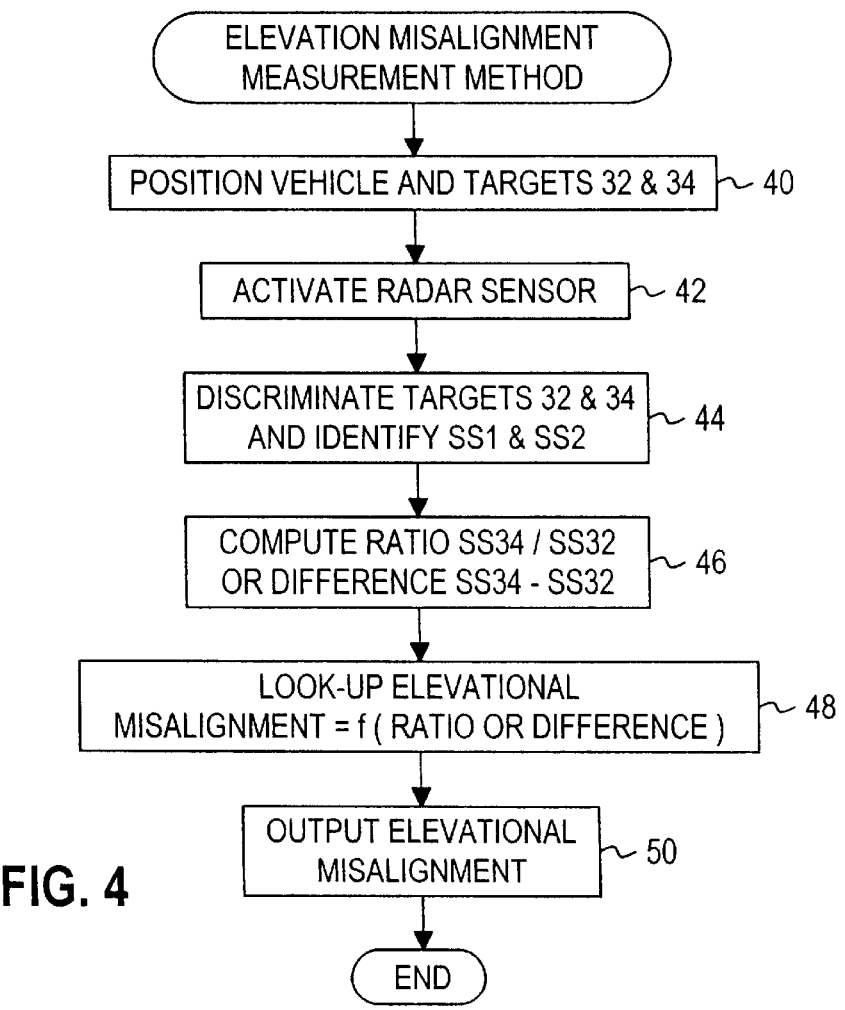
FIG. 4 is a flow diagram illustrating the method of this invention as carried out with the system of FIG. 1.

Finally, FIG. 4 presents the measurement method of this invention as a series of steps 40, 42, 44, 46, 48 and 50. First, the vehicle 10 and targets 32, 34 are positioned as described above. Then the transceiver 17 is activated, and the signal processor 18 discriminates the targets 32, 34 on one or more of the bases discussed above (range, azimuth angle, Doppler) and determines the signal strengths $SS_{32}$ and $SS_{34}$.

The processor 18 then computes the ratio ($SS_{34}/SS_{32}$) or the difference ($SS_{34}-SS_{32}$), and determines and outputs the corresponding elevational misalignment by simple table look-up.

In summary, the present invention provides a method of reliably and accurately measuring the elevational misalignment of an automotive radar sensor that has high sensitivity and that does not require adjustment of the transceiver 17. It will be understood, of course, that while the method has been described in reference to the illustrated embodiment, it is expected that various modifications in addition to those mentioned above will occur to those skilled in the art. For example, the elevational separation of targets 32, 34 may be greater or lesser than the antenna beam width. In general, the sensitivity increases with increasing elevational separation, but the antenna pattern becomes less repeatable as the distance from the beam center becomes large. Thus, it will be understood that methods incorporating these and other modifications may fall within the scope of this invention, which is defined by the appended claims.

What is claimed is:

1. A method of determining elevational misalignment of a radar sensor with respect to a desired elevation angle comprising the steps of:

positioning first and second distinguishable targets in a target detection zone of said sensor but at different elevation angles with respect to said desired elevation angle;

activating said radar sensor to emit radar energy in said target detection zone and to detect first and second return energy signals corresponding to said first and second targets;

determining magnitudes of said first and second return energy signals and forming an alignment value according to a ratio or difference of said magnitudes; and determining the elevational misalignment of said radar sensor based on a comparison of said alignment value with a reference value that occurs when said radar sensor is aligned with said desired elevation angle.

2. The method of claim 1, wherein said first and second targets are distinguishable by their range from said radar sensor.

3. The method of claim 1, wherein said first and second targets are distinguishable by differences in azimuth angle with respect to an azimuth alignment of said radar sensor.

4. The method of claim 1, wherein said first and second targets are transponders that emit different frequencies when said radar sensor emits radar energy, and said first and second targets are distinguishable by their emitted frequencies.

5. The method of claim 1, wherein said first and second targets are oppositely positioned about said desired elevation angle.

6. The method of claim 5, wherein said radar sensor emits radar energy in a beam having a nominal beam width, and said first and second targets differ from said desired elevation angle by approximately one-half said nominal beam width.

7. The method of claim 1, wherein a magnitude and a direction of said elevational misalignment is determined based on said comparison of said alignment value with said reference value.

* * * * *